United States Patent
Block et al.

(10) Patent No.: US 8,058,965 B2
(45) Date of Patent: Nov. 15, 2011

(54) ELECTRICAL MULTILAYER COMPONENT WITH REDUCED PARASITIC CAPACITANCE

(75) Inventors: Christian Block, Stainz (AT); Holger Flühr, Graz (AT); Alois Kleewein, Graz (AT); Günter Pudmich, Köflach (AT); Heinz Ragossnig, St. Georgen am Längsee (AT)

(73) Assignee: EPCOS AG, Munich (DE)

( * ) Notice: Subject to any disclaimer, the term of this patent is extended or adjusted under 35 U.S.C. 154(b) by 313 days.

(21) Appl. No.: 11/993,273

(22) PCT Filed: Jun. 19, 2006

(86) PCT No.: PCT/EP2006/005872
§ 371 (c)(1),
(2), (4) Date: Jul. 1, 2010

(87) PCT Pub. No.: WO2006/136359
PCT Pub. Date: Dec. 28, 2006

(65) Prior Publication Data
US 2011/0037559 A1    Feb. 17, 2011

(30) Foreign Application Priority Data
Jun. 20, 2005  (DE) .......................... 10 2005 028 498

(51) Int. Cl.
*H01C 7/10*  (2006.01)
(52) U.S. Cl. ........... 338/21; 338/273; 338/332; 257/774
(58) Field of Classification Search ............. 338/20–21, 338/22 R, 273–274, 314, 332; 257/700, 257/774, 781
See application file for complete search history.

(56) References Cited

U.S. PATENT DOCUMENTS

| | | | |
|---|---|---|---|
| 4,675,644 A * | 6/1987 | Ott et al. .......................... | 338/21 |
| 5,075,665 A | 12/1991 | Taira et al. | |
| 6,072,690 A * | 6/2000 | Farooq et al. .............. | 361/321.2 |
| 6,370,010 B1 | 4/2002 | Kuroda et al. | |
| 6,430,030 B1 * | 8/2002 | Farooq et al. .............. | 361/321.2 |

(Continued)

FOREIGN PATENT DOCUMENTS

DE    3930000    3/1990
(Continued)

OTHER PUBLICATIONS

International Search Report and Written Opinion dated Sep. 15, 2006 for corresponding application PCT/EP2006/005872.
(Continued)

*Primary Examiner* — Kyung Lee
(74) *Attorney, Agent, or Firm* — Fish & Richardson P.C.

(57) ABSTRACT

An electrical multi-layer component includes a body having a stack of ceramic layers, with a top and a bottom. First and second connection surfaces are on the bottom of the body. Electrode surfaces are in metallization layers among the ceramic layers. Via contacts are between metallization layers. At least one of the via contacts is connected electrically to an electrode surface or to a connection surface. An electrode surface connected to one of the connection surfaces, through a corresponding via contact, is a first electrode structure or a second electrode structure. At least one of the first or second electrode structures includes a via contact that has a blind end. A shortest distance between the first and second electrode structures is a vertical distance from the blind end to: (i) a metallization layer above or below the blind end, or (ii) a blind end of another electrode structure.

15 Claims, 2 Drawing Sheets

U.S. PATENT DOCUMENTS

| | | | |
|---|---|---|---|
| 6,462,933 B2 * | 10/2002 | Takeshima et al. | ........ 361/306.3 |
| 6,608,547 B1 | 8/2003 | Greier et al. | |
| 7,710,233 B2 | 5/2010 | Feichtinger et al. | |
| 2006/0249758 A1 | 11/2006 | Feichtinger et al. | |

FOREIGN PATENT DOCUMENTS

| | | |
|---|---|---|
| DE | 199 31 056 | 1/2001 |
| DE | 100 19 840 | 5/2001 |
| DE | 101 34 751 | 10/2002 |
| DE | 103 13 891 | 10/2004 |
| JP | 64-077029 | 3/1989 |
| JP | 02-135701 | 5/1990 |
| JP | 02-135702 | 5/1990 |
| JP | 04-004729 | 1/1992 |
| JP | 05-013524 | 1/1993 |
| JP | 06-163210 | 6/1994 |
| JP | 11-144835 | 5/1999 |
| JP | 11-204309 | 7/1999 |
| JP | 11-265808 | 9/1999 |
| JP | 2001-267037 | 9/2001 |
| JP | 2004-172369 | 6/2004 |
| JP | 2004-253757 | 9/2004 |
| JP | 2011-066439 | 3/2011 |
| WO | WO2004/086432 | 10/2004 |

OTHER PUBLICATIONS

English translation of Written Opinion for corresponding application PCT/EP2006/005872.

English Translation of Notification for Reasons for Refusal in Japanese Application No. 2008-517391, dated Mar. 30, 2011.

Machine Translation of Japanese Patent Pub. No. 05-013524 (Pub. Date Jan. 1993).

Machine Translation of Japanese Patent Pub. No. 11-144835 (Pub. Date May 1999).

Machine Translation of Japanese Patent Pub. No. 11-204309 (Pub. Date Jul. 1999).

Machine Translation of Japanese Patent Pub. No. 2001-267037 (Pub. Date Sep. 2001).

Machine Translation of Japanese Patent Pub. No. 2004-172369 (Pub. Date Jun. 2004).

Machine Translation of Japanese Patent Pub. No. 2004-253757 (Pub. Date Sep. 2004).

Machine Translation of Japanese Patent Pub. No. 2011-066439 (Pub. Date Mar. 2011).

* cited by examiner

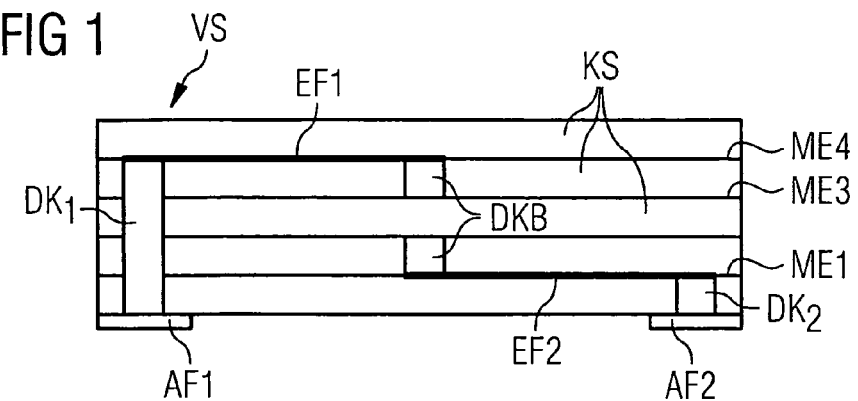
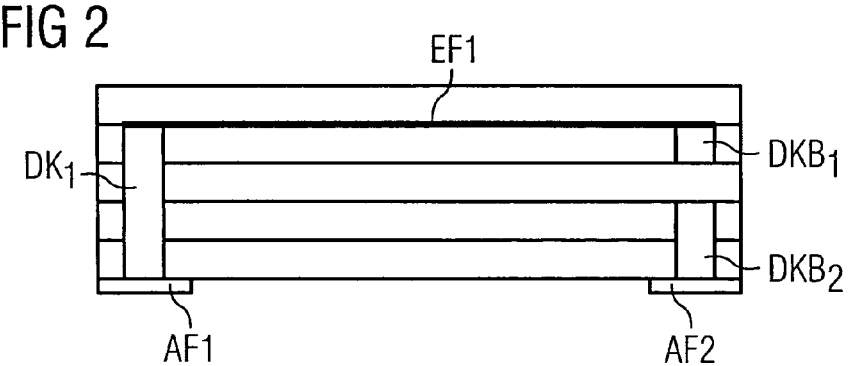
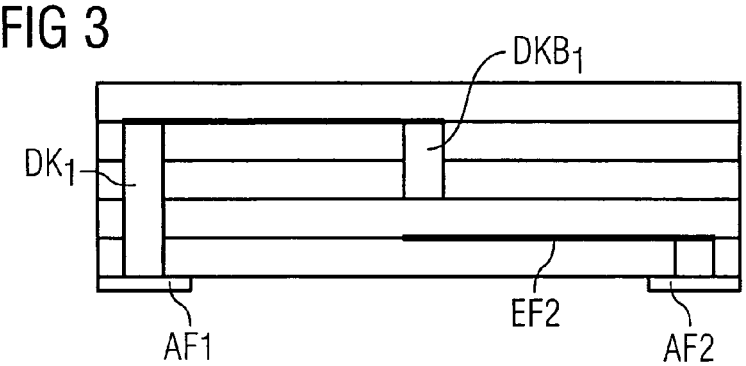
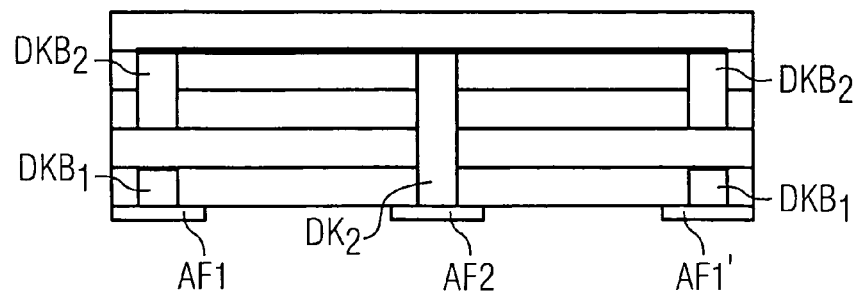

ELECTRICAL MULTILAYER COMPONENT WITH REDUCED PARASITIC CAPACITANCE

TECHNICAL FIELD

The invention relates to an electrical multi-layer component, whose body is constructed from ceramic layers, which are stacked one on top of the other and between which electrode surfaces are arranged.

BACKGROUND

Such multi-layer components can be used as capacitors, varistors, or temperature-dependent resistors (thermistors) according to the configuration of the ceramic layers and the electrode surfaces. The body of varistors is often produced from a mixture of different metal oxides, for example, based on zinc oxide. Varistors have a non-linear voltage-dependent change in resistance, which is used for protecting electrical circuits from overvoltages. The resistance value of varistors falls as the applied voltage increases.

From the publication DE 199 31 056 A1, a multi-layer varistor is known, in which non-overlapping internal electrodes are arranged in the interior of the body for reducing the resistance. The internal electrodes are here contacted on the two end faces of the component by large surface-area contact layers, which allow SMD mounting of the component. A disadvantage of this conventional component is that due to the large surface-area contact layers, parasitic capacitances and inductances are built up, which make the precise setting of the electrical characteristics of the component difficult. Furthermore, such a component requires, accordingly, an inordinate amount of space for mounting, for example, on circuit boards, due to the large contact layers. Furthermore, above all, modules in this construction, in which several of these components are integrated, are also especially large and thus feature an especially low integration density.

From the publication DE 100 19 840 A1, a ceramic multi-layer capacitor with a first electrode structure is known, which has freely ending via contacts (blind ends). The shortest distance between the two electrode structures of the capacitor is determined by the distance of overlapping electrode layers.

From the publication WO2004/086432, a multi-layer varistor is known, in which for reducing the parasitic capacitances, the internal electrodes are connected by means of via contacts both to each other and to solder bumps on the bottom side of the body.

The use of such varistors as, e.g., ESD protection components in high-frequency data lines, however, presents problems. Parasitic capacitances in known multi-layer varistors still reach regular values of more than 60 pF, which makes them unsuitable for this application. Capacitances of this order of magnitude lead to the result that all of the signals are diverted to ground from a certain limit frequency and thus the data signal carrying the information is also lost. Instead, for signals at clock rates up to 1 GHz, varistors with parasitic capacitances up to a max. ca. 1 pF are desirable.

The problem of the present invention is to specify an electrical multi-layer component with low parasitic capacitance. This problem is solved with a multi-layer component with the features of claim 1. Advantageous constructions of the invention are to be taken from the additional claims.

The multi-layer component is constructed from a stack of ceramic layers, which form a solid body. On the bottom side of the body there are first and second connection surfaces for contacting the component. Between the ceramic layers of the body there are metallization layers in which structured electrode surfaces can be arranged.

All of the electrode surfaces of an electrode structure are electrically connected to each other or to one of the connection surfaces by means of via contacts through the ceramic layers. All of the electrode surfaces connected to each other together form a first electrode structure. The corresponding electrode surfaces connected to one of the second connection surfaces and via contacts form a second electrode structure. The first and second electrode structures are separated and electrically insulated from each other. At least one of the two electrode structures has a via contact with one blind end that does not end in an electrode surface. This end points in the direction of the other electrode structure and forms in this region the shortest distance between the first and second electrode structure. The shortest distance is here measured vertical to the layer planes of the ceramic layers toward the closest metallization layer, in which an element of the other electrode structure is located.

A via contact is understood to be a cylindrical hole, e.g., filled with electrically conductive material, through at least one ceramic layer, which connects a metallization layer to another metallization layer or to a connection surface in a straight line vertical to the layer planes of the ceramic layers. A blind end of a via contact ends in a metallization plane, in which it has absolutely no contact with an electrode surface or a connection surface. The other end of the via contact, however, is always connected to an electrode surface or to a connection surface.

With the exception of the shortest distance in the region of the blind end of the via contact, first and second electrode structures of the multi-layer component run at a large distance, which includes several ceramic layers, from each other. The blind end can also form only a small capacitance to the closest metallic structure of the other electrode structure due to its small surface area. In this way, the parasitic capacitance between the first and second electrode structure is kept low.

In addition, it is advantageous to structure the first and second electrode structures and, in particular, the electrode surfaces belonging to these electrode structures, such that there is no overlap between the electrode surfaces of different electrode structures in the region of the blind via contact. Also, the distance of the electrode surfaces to each other increases and the parasitic capacitance between both electrode structures is further reduced.

The multi-layer component can also be implemented as an HTCC (High Temperature Cofired Ceramic). This material guarantees exact structurability with respect to the position of via contacts and electrode surfaces, so that a multi-layer component with an exactly defined structure and an exactly defined parasitic capacitance can be obtained.

The first and second electrode structure can each have a via contact with one blind end. The two blind ends can then be arranged one above the other in the stack of the body and point towards each other. If the thickness of a single ceramic layer is the shortest distance in the region of these two blind ends, and if the blind via contacts are each connected to an electrode surface, then the minimum distance of said two electrode surfaces corresponds to the layer thickness of the three ceramic layers lying in-between. Preferably, the via contacts are extended by the blind ends, and thus lead in a straight line through several ceramic layers. In this way, the associated electrode surfaces are distanced even farther from each other by the first and second electrode structures.

However, it is not necessary for both electrode structures to have electrode surfaces. It is also possible, for example, that one of the two electrode structures is made from only one via contact, which reaches through possibly several ceramic layers and which is connected to one of the connection surfaces.

In a multi-layer component, several first connection surfaces and a corresponding number of first electrode structures connected to these surfaces can be provided. The several first electrode structures can be separated from each other galvanically and can each have a via contact with one blind end. An overlap with the second electrode structure can then take place exclusively in the region of this blind end, wherein the second electrode structure can also have a via contact with a blind end, for example, in the region of overlap. Several of these first electrode structures can then overlap a single second electrode structure. It is also possible, however, to provide in the multi-layer component both several first electrode structures and also several second electrode structures, where the number of first and second electrode structures need not be equal.

For further minimization of the parasitic capacitance of the multi-layer component, the connection surfaces are distributed on the bottom side of the body so that they are at a maximum distance from each other. This can be achieved in that the connection surfaces are provided at the edges, in the corners, and/or in the middle of the lowermost ceramic layer. Two connection surfaces, which are arranged on the bottom side at two diagonally opposite corners, have the greatest distance from each other. An easily accessible connection surface on the bottom side has a strip-like construction along one edge of the base surface or the body. These connection surfaces can be connected, for example, in the middle by means of via contacts to one or more electrode surfaces.

The electrode surfaces of different electrode structures are preferably arranged in metallization layers far removed from each other. It is also possible to provide only one electrode surface for each electrode structure. Here it is useful for the electrode surfaces to have a strip-like construction and to let them run towards each other starting, e.g., from different corners of the body. For a symmetrical arrangement, an overlap in the middle (relative to the base surface) of the body can be maintained. The one or more via contacts with a blind end are then constructed there, which point from an electrode structure to the corresponding electrode surface of the other electrode structure. Advantageously, the second electrode structure is also provided with a via contact with a blind end. For reasons of symmetry, it is advantageous to construct the blind ends of the via contacts for both electrode structures at the same distance to the associated, closest electrode surface.

If there are several first connection surfaces, then it is advantageous to arrange the second connection surface in the middle. In contrast, it is advantageous to arrange the first connection surface in the corners on the bottom side. Here, the electrode surfaces can also have a strip-like construction and can run from the via contacts arranged above the first connection surfaces in the direction of the body middle, where they overlap corresponding via contacts belonging to the second electrode structure.

If first and second electrode structures are present each in an even number, then an overlap with two electrode structures of different type between each can be realized. This can then take place in a region of the body removed from the connection surfaces. That is, no connection surfaces are provided in the stack underneath the via contacts with the blind ends.

The multi-layer component can be constructed from a varistor ceramic, for example, on the basis of doped zinc oxide. The multi-layer component then represents a varistor with low but defined capacitance. Such a varistor can be used advantageously as an ESD protection component in data lines, which are operated at high clock rates, for example, up to one gigahertz. The low capacitance of the varistor, which does represent a shunt line, prevents the data signal from being diverted to ground via the parasitic capacitance of the varistor forming a high-pass filter and thus from being lost.

The multi-layer component can also be constructed from a ceramic material with negative or positive temperature coefficients of resistance. In this way, it can be used as a PTC or NTC type thermistor.

In addition to the function layers, the ceramic body can include additional layers, which guarantee, for example, the stability of the body. Such layers are then preferably constructed as dielectric layers, in order to generate no new current paths. Additional dielectric layers are then also arranged outside the current path that appears between the first and second electrode structures when the component responds. Such a response of the component is achieved, in the case of a varistor, when the varistor voltage is exceeded between the first and second electrode structures or, in the case of a PTC, when a certain temperature is exceeded.

Below, the multi-layer component is explained in more detail with reference to embodiments and the associated figures. The figures are used for illustrating the invention and are laid out only schematically and not true to scale. Parts that are identical or that have identical functions are designated with identical reference symbols.

DESCRIPTION OF THE DRAWINGS

FIG. 1 shows, in schematic cross section, a multi-layer component with two electrode structures, each with an electrode surface, FIG. 2 shows, in schematic cross section, a multi-layer component with two electrode structures but a total of only one electrode surface, FIG. 3 shows, in schematic cross section, a multi-layer component with two electrode structures and a via contact with one blind end, FIG. 4 shows, in schematic cross section, a multi-layer component with two first electrode structures and a second electrode structure.

DETAILED DESCRIPTION

Figure 5:
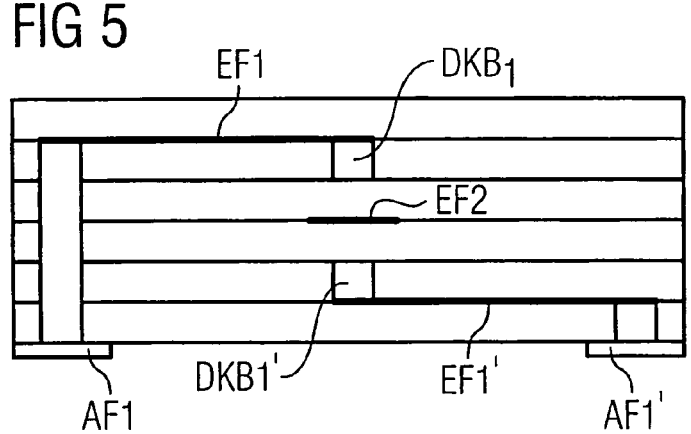
FIG. 5 shows, in schematic cross section, a multi-layer component with an overlap of two first and one second electrode structures.

FIG. 1 shows a simple embodiment of a multi-layer component VS in schematic cross section. The ceramic body is built from five ceramic layers KS, which are arranged in a stack one above the other and which are connected to each other rigidly by sintering. Between every two ceramic layers there is a metallization layer ME, in which metallization can be provided. On the bottom side of the body there is a first connection surface AF1 and a second connection surface AF2, which are respectively connected by means of a via contact DK to a first and second electrode surface EF1, EF2. The two electrode surfaces EF1, EF2 belonging to different electrode structures are arranged largely without mutual overlap in metallization layers ME1, ME4 far removed from each other. The two electrode structures overlap only in a tightly limited region in terms of surface area. There, via contacts DKB are arranged, each with one blind end, wherein the blind end points in the direction of the corresponding other electrode structure. The two ends of the blind via contacts DKB are separated from each other by the thickness of one ceramic layer KS.

Deviating from this arrangement, FIG. 2 shows a first electrode structure, which is connected to a first connection surface AF1 and which includes a via contact DK1 and a first electrode surface EF1, and also a via contact DKB1 with blind end DKB. A second electrode structure is connected to the second connection surface AF2 and includes only one via contact DKB2 with a blind end. The two blind ends are arranged in a stack one above the other and mutually overlap each other. The second electrode structure here has no electrode surface.

While in the first two figures the region of the shortest distance is to be found between the blind ends of via contacts, the structure of FIG. 3 shows a possibility of providing the region of the shortest distance between the first and second electrode structures between the blind end of a via contact DKB1 and a second electrode surface EF2. With this construction, it is also possible to provide first and second electrode surfaces in metallization layers far from each other and thus with the lowest possible capacitance in-between.

FIG. 4 shows as another embodiment in schematic cross section a multi-layer component, in which several first connection surfaces AF1, AF1' are provided, of which two are shown in the figure. A second connection surface AF2 is provided with a second electrode structure comprising a via contact DK2, a second electrode surface EF2, and two via contacts with a blind end DKB2. A first electrode structure, which here includes only one via contact DKB1 with a blind end, is connected to each first connection surface AF1. These first connection surfaces overlap the corresponding blind ends of the via contacts DKB2 of the second electrode structure. The arrangement of connection surfaces and electrode surfaces is preferably symmetric and can include more than the two illustrated first electrode structures.

FIG. 5 shows, in schematic cross section, another multi-layer component, in which, in the section plane, two first electrode structures with first electrode surfaces EF1, EF1' are provided, which are arranged in metallization layers far removed from each other. Both first electrode surfaces EF1, EF1' are each provided with a via contact DKB1, DKB1' with a blind end, which are both arranged in a stack one above the other. Between these two blind ends each allocated to a first electrode structure there is a second electrode surface EF2, which is shown in the figure only in section, because it runs perpendicular to the plane of the drawing. Deviating from the representation, the second electrode surface can also have via contacts with a blind end, with these contacts being arranged one above the other and preferably as shown in the middle of the body. The second electrode surface is connected to at least one, but preferably two, via contacts (not shown in the figure), which connect the second electrode surface to second connection surfaces on the bottom side of the multi-layer component. Here also, the distance between the electrode surfaces of different electrode structures equals at least two ceramic layers, but preferably more, while the minimum distance to the blind ends of the via contact is reduced to the thickness of one ceramic layer.

Figure 6:
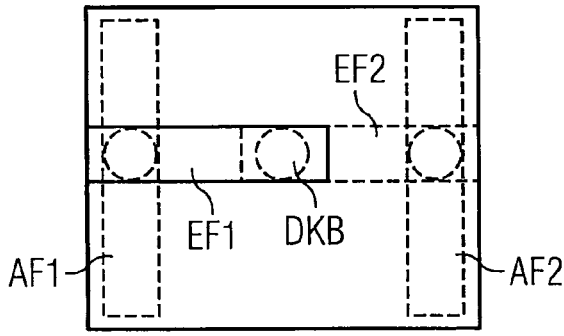
FIG. 6 shows, in schematic top view, a multi-layer component with two electrode surfaces.

FIG. 6 shows a possible arrangement of electrode surfaces, connection surfaces, and via contacts in top view. The construction can correspond in cross section to FIG. 1. First and second electrode surfaces EF1, EF2 are connected by means of via contact DK to first and second connection surfaces AF1, AF2 on the bottom side of the body. The electrode surfaces have a strip-like construction just like the connection surfaces and show overlap only in the region of a central via contact with the blind end DKB. The via contacts with the blind end DKB can be provided on one or both electrode surfaces.

Figure 7:
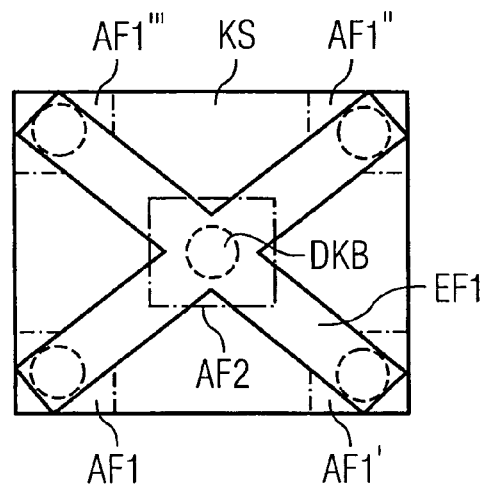
FIG. 7 shows, in schematic top view, a component with five connection surfaces.

FIG. 7 shows a top view of a multi-layer component corresponding to the section shown in FIG. 4. In this example, four first connection surfaces AF1, AF1', AF1'', AF1''' are provided, which are connected by means of via contacts to a first electrode surface EF1. This is constructed in the form of two intersecting, strip-shaped metallization layers. A second connection surface AF2 is connected to a second electrode structure, which includes only one via contact with a blind end DKB. This is arranged in the middle and with its blind end forms the shortest distance to the first electrode structure.

Figure 8:
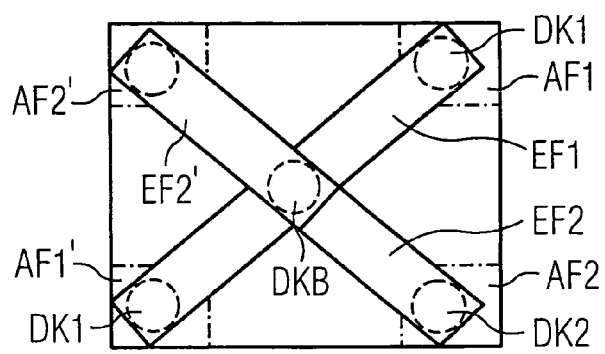
FIG. 8 shows, in top view, a multi-layer component with five connection surfaces and three electrode structures.

FIG. 8 shows, in schematic top view, the arrangement of electrode structures for an embodiment, which corresponds to the cross section shown in FIG. 5. In this structure, there are two first connection surfaces AF1, AF1', which are connected by means of via contacts DK1 to a first electrode EF1. This has a strip-like construction and connects these two via contacts DK1 diagonally.

In addition, two second connection surfaces AF2, AF2' are provided, which are each connected by means of via contacts DK2 to a second electrode surface EF2, EF2'. These also have a strip-like construction and reach from one corner with the via contact to the connection surface up to the middle, in which a via contact DKB with a blind end is provided. The second electrode surfaces are arranged in metallization layers that are far removed from each other, while the first electrode surface EF1 has a strip-like construction, is arranged in a middle metallization layer, and overlaps the two ends of the second electrode surfaces EF2.

The details shown with reference to individual figures or described in embodiments can also be combined with other embodiments. In addition, it is possible to provide each electrode structure with more than one electrode surface EF, wherein different electrode surfaces assigned to an electrode structure can be arranged in different metallization layers. Here, it is especially possible to construct these additional electrode surfaces with a smaller surface than the main electrode surface, which leads up to the region of overlap with the via contacts with the blind end.

In all of the vertical overlapping regions between different electrode structures, via contacts with a blind end can be provided on both electrode structures. However, it is also possible that an overlap of different electrode structures takes place only between a blind end and an electrode surface. It is also possible, as shown, for example, in FIG. 5, to provide several overlaps between multiple electrode structures of different or equivalent type in a single overlapping region, which corresponds to the size of a via contact.

The electrode surfaces can have a strip-like construction with a correspondingly smaller surface area, in order to lower the capacitance. However, it is also possible to construct the electrode surfaces with an arbitrary base surface deviating from this construction, in order, for example, to provide a large surface area electrode surface that can extend over the greatest part of a metallization plane. However, advantageously the strip-shaped electrode surfaces constructed with a small base surface are always as described in the embodiments.

All of the shown structures can be used both for varistors and thermistors. In all of the cases, they can be produced with high accuracy, especially in an HTCC process, which results in only a minimal change in dimension during the sintering process and therefore works with structural accuracy. However, other ceramic types are also possible with low shrinkage during sintering, such as, for example, LTCC (Low Temperature Cofired Ceramics). By means of the structural accuracy, the capacitance of the component can also be set exactly. Likewise, the minimum distances between different electrode structures are adjustable, because they always correspond to the thickness of one or more ceramic layers, which also has good reproducibility. By means of this distance, for a varistor, the varistor voltage is set. The conductivity of such a varistor component is then dependent on the volume of the ceramic body, which can be adjusted arbitrarily according to requirements through larger base surface areas or a higher number of ceramic layers.

The invention claimed is:

1. An electrical multi-layer component comprising:
a body comprising a stack of ceramic layers, the body comprising a top and a bottom;
first and second connection surfaces on the bottom of the body;
metallization layers among the ceramic layers, the metallization layers comprising electrode surfaces;
via contacts between metallization layers, at least one of the via contacts being connected electrically to an electrode surface or to a connection surface;
wherein an electrode surface connected to one of the connection surfaces, by way of a corresponding via contact, comprises a first electrode structure or a second electrode structure;
wherein at least one of the first or second electrode structures comprises a via contact that has a blind end; and
wherein, in the stack, a shortest distance between the first and second electrode structures is a vertical distance from the blind end to: (i) a metallization layer above or below the blind end, or (ii) a blind end of another of the first and second electrode structures.

2. The multi-layer component of claim 1, wherein the first and second electrode structures each comprises a via contact comprising a blind end, and wherein blind ends of the first and second electrode structures are arranged in the stack, one above the other, and point towards each other.

3. The multi-layer component of claim 1, wherein electrode surfaces of the first and second electrode structures overlap only in a region of the via contact comprising the blind end.

4. The multi-layer component of claim 1, wherein at least three ceramic layers are between the first and second electrode surfaces, and wherein a shortest distance between the first and the second electrode structures corresponds to a thickness of one of the at least three ceramic layers.

5. The multi-layer component of claim 1, wherein the first connection surface is one of several first connection surfaces and the first electrode structure is one of several first electrode structures, and wherein first electrode structures are connected to corresponding first connection surfaces which are separated from each other galvanically and which each comprise a via contact comprising a blind end.

6. The multi-layer component claim 1, wherein the first and second connection surfaces are distributed on the bottom of the body so that there is a maximum distance between the first and second connection surfaces.

7. The multi-layer component of claim 1, wherein the second connection surface is between the first connection surface and a third connection surface, the first and third connection surfaces being in corners of the bottom of the body.

8. The multi-layer component of claim 1, wherein the via contact that comprises the blind end is in a middle of a base surface area of the stack, the base surface being parallel to the ceramic layers.

9. The multi-layer component of claim 8, wherein via contacts of different electrode structures comprise blind ends in a region where there is no connection surface.

10. The multi-layer component of claim 6, wherein at least two via contacts comprising blind ends are in a middle of the body relative to a base surface area of the stack, and wherein electrode surfaces comprise strip-like constructions and extend a the direction towards a corresponding connection surface starting from an interior of a corresponding metallization plane.

11. The multi-layer component of claim 10, wherein the strip-shaped electrode surfaces each extend, from a middle of a corresponding metallization plane, to one of four corners of the stack, the stack comprising a rectangular base surface area.

12. The multi-layer component of claim 10, wherein the first and second connection surfaces are the only connection surfaces on the multi-layer component the first and second connection surfaces extending along a side edge of the bottom and being located opposite each other.

13. The multi-layer component of claim 1, wherein the body comprises an HTCC (High Temperature Cofired Ceramic) material.

14. A varistor comprising the multi-layer component of claim 1, the ceramic layers comprising a varistor ceramic comprising zinc oxide.

15. A thermistor comprising the multi-layer component of claim 1, the ceramic layers being configured to provide a PTC (Positive Temperature Coefficient) effect or an NTC (Negative Temperature Coefficient) effect.

* * * * *

UNITED STATES PATENT AND TRADEMARK OFFICE
CERTIFICATE OF CORRECTION

PATENT NO.          : 8,058,965 B2                                     Page 1 of 1
APPLICATION NO.     : 11/993273
DATED               : November 15, 2011
INVENTOR(S)         : Block et al.

It is certified that error appears in the above-identified patent and that said Letters Patent is hereby corrected as shown below:

Column 8, Claim 10, Line 27
After "a" Delete "the"

Column 8, Claim 12, Line 37
After component, Insert --,--

Signed and Sealed this
Twenty-eighth Day of February, 2012

David J. Kappos
*Director of the United States Patent and Trademark Office*